(12) United States Patent
Mueller et al.

(10) Patent No.: US 9,792,280 B2
(45) Date of Patent: *Oct. 17, 2017

(54) CONTEXT BASED SYNONYM FILTERING FOR NATURAL LANGUAGE PROCESSING SYSTEMS

(71) Applicant: International Business Machines Corporation, Armonk, NY (US)

(72) Inventors: Kay Mueller, Berlin (DE); Christopher M. Nolan, Acton, MA (US); William G. Visotski, Merrimack, NH (US); David E. Wilson, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/172,577

(22) Filed: Jun. 3, 2016

(65) Prior Publication Data

US 2016/0283468 A1   Sep. 29, 2016

Related U.S. Application Data

(63) Continuation of application No. 14/285,019, filed on May 22, 2014, now Pat. No. 9,378,204.

(51) Int. Cl.
*G06F 17/27* (2006.01)
*G06F 17/28* (2006.01)
*G06F 17/30* (2006.01)

(52) U.S. Cl.
CPC ...... *G06F 17/2795* (2013.01); *G06F 17/2705* (2013.01); *G06F 17/2785* (2013.01);
(Continued)

(58) Field of Classification Search
None
See application file for complete search history.

(56) References Cited

U.S. PATENT DOCUMENTS

| 5,237,503 A | 8/1993 | Bedecarrax et al. |
| 7,330,811 B2 | 2/2008 | Turcato et al. |

(Continued)

OTHER PUBLICATIONS

Caon et al "Finding synonyms and other semantically-similar terms from coselecion data", Proc. 1$^{st}$ Asutralasian Web Conference (AWC) Jan.-Feb. 2013, pp. 35-42.*

(Continued)

*Primary Examiner* — Pierre-Louis Desir
*Assistant Examiner* — Yi-Sheng Wang
(74) *Attorney, Agent, or Firm* — Stephen J. Walder, Jr.; William J. Stock (57) ABSTRACT

Mechanisms are provided for performing context based synonym filtering for natural language processing. Content is parsed into one or more conceptual units, wherein each conceptual unit comprises a portion of text of the content that is associated with a single concept. For each conceptual unit, a term in the conceptual unit is identified that has a synonym to be utilized during natural language processing of the content. A first measure of relatedness of the term to at least one other term in the conceptual unit is determined. A second measure of relatedness of the synonym of the term to the at least one other term in the conceptual unit is determined. A determination whether or not to utilize the synonym when performing natural language processing on the conceptual unit is made based on the first and second measures of relatedness and natural language processing on the content is performed accordingly.

20 Claims, 4 Drawing Sheets

(52) U.S. Cl.
CPC ........ *G06F 17/28* (2013.01); *G06F 17/30315* (2013.01); *G06F 17/30684* (2013.01); *G06F 17/30699* (2013.01); *G06F 17/30864* (2013.01)

(56) References Cited

U.S. PATENT DOCUMENTS

| | | | |
|---|---|---|---|
| 7,599,930 | B1 | 10/2009 | Burns et al. |
| 7,636,714 | B1 | 12/2009 | Lamping et al. |
| 8,180,760 | B1 * | 5/2012 | Carver ................ G06F 17/3071 707/708 |
| 8,275,803 | B2 | 9/2012 | Brown et al. |
| 8,321,201 | B1 | 11/2012 | Baker et al. |
| 8,515,731 | B1 | 8/2013 | Ramirez Robredo et al. |
| 8,538,984 | B1 | 9/2013 | Mahabal et al. |
| 8,661,012 | B1 | 2/2014 | Baker et al. |
| 8,719,282 | B1 | 5/2014 | Shaw et al. |
| 2004/0133418 | A1 | 7/2004 | Turcato et al. |
| 2007/0011154 | A1 | 1/2007 | Musgrove et al. |
| 2007/0203929 | A1 * | 8/2007 | Bolivar ............. G06F 17/30672 |
| 2009/0287678 | A1 | 11/2009 | Brown et al. |
| 2011/0047138 | A1 | 2/2011 | Dong et al. |
| 2011/0066587 | A1 | 3/2011 | Ferrucci et al. |
| 2011/0125734 | A1 | 5/2011 | Duboue et al. |
| 2011/0251839 | A1 | 10/2011 | Achtermann et al. |
| 2013/0007055 | A1 | 1/2013 | Brown et al. |
| 2013/0018652 | A1 | 1/2013 | Ferrucci et al. |
| 2013/0031097 | A1 | 1/2013 | Sutter et al. |
| 2013/0031122 | A1 | 1/2013 | Riezler et al. |
| 2013/0066886 | A1 | 3/2013 | Bagchi et al. |
| 2013/0132363 | A1 | 5/2013 | Dong et al. |
| 2013/0185307 | A1 * | 7/2013 | El-Yaniv ............. G06F 17/2785 707/748 |
| 2014/0067368 | A1 * | 3/2014 | Yih ................... G06F 17/30672 704/9 |
| 2014/0365494 | A1 * | 12/2014 | Gangavaram ..... G06F 17/30598 707/739 |
| 2015/0066711 | A1 * | 3/2015 | Chua ...................... G06Q 10/06 705/28 |
| 2015/0227626 | A1 * | 8/2015 | Mahapatra ........ G06F 17/30864 707/706 |
| 2015/0339290 | A1 | 11/2015 | Mueller et al. |

OTHER PUBLICATIONS

Caon et al ("Finding synonyms and other semantically-similar terms from coselecion data", Proc. 1st Australasian Web Conference (AWC) Jan.-Feb. 2013).*

Canon at al ("Finding synonyms and other semantically-similar terms from coselection data", Proc. $1^{st}$ Australasian Web Conference (AWC) Jan.-Feb. 2013).*

List of IBM Patents or Patent Applications Treated as Related, Jun. 3, 2016, 2 pages.

Caon, Glyn et al., "Finding synonyms and other semantically-similar terms from coselection data", Proceedings of the 1st Australasian Web Conference (AWC), Jan.-Feb. 2013, pp. 35-42.

Chu-Carroll, J et al., "Finding needles in the haystack: Search and candidate generation", IBM Journal of Research and Development, vol. 56, Issue 3/4, May/Jul. 2012, 6:1-6:12.

Cilibrasi, Rudi et al., "Clustering by Compression", Corrected Version of: IEEE Transactions on Information Theory, vol. 51, No. 4, Apr. 2005, pp. 1523-1545.

High, Rob , "The Era of Cognitive Systems: An Inside Look at IBM Watson and How it Works", IBM Corporation, Redbooks, Dec. 12, 2012, 16 pages.

Lally, A et al., "Question analysis: How Watson reads a clue", IBM Journal of Research and Development, vol. 56, No. 3/4, Paper 2, May/Jul. 2012, pp. 2:1-2:14.

McCord, M.C. et al., "Deep parsing in Watson", IBM J. Res. & Dev. vol. 56 No. 3/4 Paper 3, May/Jul. 2012, pp. 3:1-3:15.

Ruiz-Casado, Maria et al., "Using context-window overlapping in synonym discovery and ontology extension", Department of Computer Science, University of Madrid, http://ir.ii.uam.es/pubs/nlp/ranlp05.pdf, publication date unknown, retrieved May 14, 2014, 7 pages.

Shimizu, Nobuyuki et al., "Metric Learning for Synonym Acquisition", Proceedings of the 22nd International Conference on Computational Linguistics (Coling 2008), pp. 793-800.

Van Der Plas, Lonneke et al., "Finding Synonyms Using Automatic Word Alignment and Measures of Distributional Similarity", Proceedings of the COLING-ALC 2006 Main Conference Poster Sessions, Jul. 2006, pp. 866-873.

Yuan, Michael J., "Watson and healthcare, How natural language processing and semantic search could revolutionize clinical decision support", IBM developerWorks, IBM Corporation, Apr. 12, 2011, 14 pages.

* cited by examiner

CONTEXT BASED SYNONYM FILTERING FOR NATURAL LANGUAGE PROCESSING SYSTEMS

This application is a continuation of application Ser. No. 14/285,019, filed May 22, 2014, status awaiting publication.

BACKGROUND

The present application relates generally to an improved data processing apparatus and method and more specifically to mechanisms for performing context based synonym filtering for natural language processing systems.

Natural language processing (NLP) is a field of computer science, artificial intelligence, and linguistics concerned with the interactions between computers and human (natural) languages. As such, NLP is related to the area of human-computer interaction. Many challenges in NLP involve natural language understanding, i.e. enabling computers to derive meaning from human or natural language input.

Modern NLP algorithms are based on machine learning, especially statistical machine learning. The paradigm of machine learning is different from that of most prior attempts at language processing. Prior implementations of language-processing tasks typically involved the direct hand coding of large sets of rules whereas the machine-learning paradigm calls instead for using general learning algorithms (often, although not always, grounded in statistical inference) to automatically learn such rules through the analysis of large corpora of typical real-world examples. A corpus (plural, "corpora") is a set of documents (or sometimes, individual sentences) that have been hand-annotated with the correct values to be learned.

Many different classes of machine learning algorithms have been applied to NLP tasks. These algorithms take as input a large set of "features" that are generated from the input data. Some of the earliest-used algorithms, such as decision trees, produced systems of hard if-then rules similar to the systems of hand-written rules that were then common. Increasingly, however, research has focused on statistical models, which make soft, probabilistic decisions based on attaching real-valued weights to each input feature. Such models have the advantage that they can express the relative certainty of many different possible answers rather than only one, producing more reliable results when such a model is included as a component of a larger system.

One type of NLP system is a search engine, such as an Internet search engine, e.g., Google™, Yahoo!™, or the like. Such search systems receive one or more terms and search a corpus of content for matching terms and return results indicating the sources of content having the specified terms. In some instances, more advanced processing of search terms is performed which includes the implementation of NLP algorithms to improve the results generated by the search engine.

Another type of NLP system is a Question and Answer (QA) system which receives an input question, analyzes the input question using NLP algorithms, and returns results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for performing context based synonym filtering for natural language processing is provided. The method comprises parsing, by the data processing system, content into one or more conceptual units, wherein each conceptual unit comprises a portion of text of the content that is associated with a single concept. The method further comprises, for each conceptual unit in the one or more conceptual units, identifying, by the data processing system, a term in the conceptual unit that has a synonym to be utilized during natural language processing of the content. Moreover, the method comprises determining, by the data processing system, a first measure of relatedness of the term to at least one other term in the conceptual unit and determining, by the data processing system, a second measure of relatedness of the synonym of the term to the at least one other term in the conceptual unit. In addition, the method comprises determining, by the data processing system, whether or not to utilize the synonym when performing natural language processing on the conceptual unit. Furthermore, the method comprises performing, by the data processing system, natural language processing on the content based on results of determining whether or not to utilize the synonym.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

It has been recognized that synonyms play an integral part in any natural language processing (NLP) system, such as may be used by a search engine, question and answer (QA) system, or the like. Synonyms allow text to be found that, while not matching the exact terms searched, match the concepts searched for. To this end, a great deal of work has been done to create exhaustive synonym lists for both specific domains, such as cancer research, and open domains, such as WordNet®, or the like.

While synonym lists provide greater functionality for NLP systems, problems exist with such synonym lists in that language is imprecise. That is, a synonym that applies in one domain or query does not necessarily apply in another. For example, if one submits a question to a NLP system, such as a QA system, that is of the type "What submarine can stay under water the longest?" one would not find "H2O" to be a useful synonym for "water." Likewise, if one where to ask or search for "What year did John F. Kennedy join the US Navy?", the term "fluorine" would not be a useful synonym for "F".

Several approaches have been created to attempt to filter out non-applicable synonyms. These approaches typically fall into two categories. A first category requires the creation of synonym lists which may include generic synonym lists and separate domain-specific synonym lists using manual and/or semi-automatic mechanisms. A second category requires the recordation of user interactions to determine synonyms based on previous user actions.

The illustrative embodiments provide mechanisms for performing context based synonym filtering for natural language processing systems. That is, the mechanisms of the illustrative embodiments determine the applicability of a synonym to the submitted query or question, using the context of the entire query or question, and without the need of domain-specific synonym lists, dictionaries, or recorded user interactions. The mechanisms of the illustrative embodiments utilize determined measures of relatedness of terms with other terms in a conceptual unit and determined measures of relatedness of synonyms of these terms with the other terms in the conceptual unit as a basis for determining whether the synonyms are valid synonyms for the original terms. For example, if semantic distances between the synonym of an original term, and one or more other terms in the conceptual unit are less than or equal to the semantic distances between the original term and the one or more other terms in the conceptual unit, then it may be determined that the synonym is a valid synonym for the original term.

In other words, in an implementation within a QA system, the mechanisms of the illustrative embodiments filter out non-applicable synonyms by comparing the semantic similarity of the proposed synonym to the rest of the input question with the similarity of the original term to the rest of the input question. For example, if the input question is "What year did John F. Kennedy join the US Navy?", and the proposed synonym is "fluorine" for the term "F", the mechanisms of the illustrative embodiments measure the semantic affinity or distance of the term "F" to the rest of the input question and the semantic affinity or distance of the term "fluorine" to the rest of the input question and use the resulting measures of affinity/distance to determine the applicability of the synonym. Semantic "distance" is the distance in semantic space such that the smaller the distance, the more related the compared terms are or, in other words, if two terms have the same or similar meanings in a natural language sense, the distance is smaller than if they are dissimilar. Semantic "affinity" is an abstract view of the inverse of the distance, e.g., 1/distance, or in other words, the closer the distance (more related), the higher the affinity. Semantic affinity may also be referred to as semantic relatedness.

Semantic affinity or distance can be measured in many different ways. For example, a modified form of the Normalized Compressive Distance (NCD) or Normalized Google Distance (NGD) may be utilized. NCD is described in, for example, Cilibrasi et al., "Clustering by Compression," IEEE Transactions on Information Theory, Vol. 51, No. 4, April 2005, pages 1523-1545, which is hereby incorporated by reference. NGD is described on the corresponding Wikipedia webpage for this term. NGD is a semantic similarity measure derived from the number of hits returned by the Google search engine for a given set of keywords. Keywords with the same or similar meanings in a natural language sense tend to be "close" in units of Google distance, while words with dissimilar meanings tend to be farther apart. Specifically, the normalized Google distance between two search terms x and y is (equation 1):

$$NGD(x, y) = \frac{\max\{\log f(x), \log f(y)\} - \log f(x, y)}{\log M - \min\{\log f(x), \log f(y)\}}$$

where M is the total number of web pages searched by Google; f(x) and f(y) are the number of hits for search terms x and y, respectively; and f(x, y) is the number of web pages on which both x and y occur. If the two search terms x and y never occur together on the same web page, but do occur separately, the normalized Google distance between them is infinite. If both terms always occur together, their NGD is zero, or equivalent to the coefficient between x squared and y squared.

Semantic affinity/distance measuring mechanisms of the illustrative embodiments are modified to operate on conceptual units that have a size smaller than the portion of content as a whole. Thus, for example, if a portion of content is a document, then the conceptual unit is smaller than the document, e.g., a sentence, clauses, n-grams, or the like. Similarly, if a portion of content is a query or input question, then the conceptual unit may likewise be clauses, n-grams, individual terms, or the like. Thus, whereas NCD and NGD use a corpus based on complete documents, or a corpus strung together as one continuous string, the corpus of the illustrative embodiments is based on conceptual units which are a unit of text that represents a single statement, question, idea, concept, or the like, that has a size less than the total size of the portion of content in which the conceptual unit is provided.

The goal of defining conceptual units is to model and take advantage of how people naturally try to reduce ambiguity, amphiboly, and equivocation in their writing. In other words, one might use two different meanings of the same word in a document. However, it is less likely that one would use two meanings of the same word in a paragraph, and even less so in a sentence or clause. Thus, the conceptual unit is the smallest size sub-portion of text that represents a concept within the portion of content. The simplest form of a conceptual unit is a sentence or paragraph; however other conceptual units such as n-grams, clauses, phrases, terms, and the like, may be used without departing from the spirit and scope of the illustrative embodiments. The exact size of the conceptual units, or the semantic resolution, depends on the size of the corpus, the writing styles of the contributors to that corpus, and the amount of ambiguity allowable to the system.

The mechanisms of the illustrative embodiments parse out every conceptual unit in every portion of content of a corpus, e.g., every document in the corpus, and uses these conceptual units as a basis for calculating similarity across a smaller window. That is, rather than two terms being considered related to one another if they appear anywhere within the same document or if they are adjacent to one another, with the mechanisms of the illustrative embodiments, the two terms are considered to be related only if they appear within the same collection of words describing a single concept, as represented by the conceptual unit.

For each conceptual unit in the portion of content, e.g., a query or input question, a portion of a document, or the like, an operation is performed to determine the appropriateness of synonyms for terms within the conceptual unit. The operation involves first removing all stop words in the conceptual unit, i.e. words that are generic in nature and provide little meaningful information, e.g., the words "the", "a", "an", and the like. The original term in the conceptual unit for which a synonym is to be evaluated is extracted from the conceptual unit, e.g., in the examples mentioned above, the "F" or "water" terms may be extracted from the example input questions. Thereafter, measures of the relatedness or affinity of the extracted original term to the other terms in the conceptual unit are generated. In addition, measures of the relatedness or affinity of the synonym to the other terms in the conceptual unit are generated. The measures are then compared and if a predetermined relationship between the measures exists, then it is determined that the synonym is a valid synonym for consideration when performing natural language processing operations on the original portion of content.

For example, a semantic affinity or distance between the original term and a first term in the conceptual unit, e.g., between "F" and "John", may be calculated using a NCD, NGD, or other affinity measuring algorithm. A semantic affinity or distance between the synonym and the first term in the conceptual unit, e.g., "fluorine" and "John", may be calculated using a NCD, NGD, or other affinity measuring algorithm. The functions of these semantic affinities may be compared such that if it is determined that the semantic affinity of the synonym is equal to or greater than the semantic affinity of the original term, then the synonym is considered to be a valid synonym for the original term. This can be performed with regard to multiple terms in the conceptual unit and a combination of the plurality of resulting affinities may be used to make the determination as to whether the synonym is a valid synonym or not, e.g., an average measure of affinity, a combination of the measures of affinity, or other combination of measures of affinity for the original term and measures of affinity for the synonym may be utilized.

In one illustrative embodiment, the following relationship is evaluated for each conceptual unit and combination of original term and corresponding candidate synonym (equation 2):

$$\sum_{n=1}^{N} \frac{1}{N} f(W_{n'} ORIG) \le \sum_{n=1}^{N} \alpha \frac{1}{N} f(W_{n'} SYN) \begin{Bmatrix} \text{pass} \\ \text{fail} \end{Bmatrix}$$

where N is the number of other words/terms, or remaining words/terms, in the conceptual unit, W is the set of remaining words/terms in the conceptual unit, ORIG is the original term, SYN is the synonym being evaluated, alpha is a constant that facilitates imprecise matches, and f( ) is a semantic affinity/distance function using a conceptual unit basis for performing the semantic affinity/distance calculations. If the relationship is satisfied, it is considered a "pass" result and if the relationship is not satisfied, then it is considered a "fail" result. If the result is a "pass" then the synonym is likely to be useful and should be used during performance of the natural language processing operation. If the result is a "fail", it is unlikely that the synonym will be useful and should not be used during performance of the natural language processing operation.

The natural language processing (NLP) operation may be any NLP operation suitable for implementing NLP on structured or unstructured text. Such NLP operations may involve processing text of a query or input question for purposes of performing searches, for purposes of performing question answering by a QA system, or the like. Any NLP operation is intended to be within the spirit and scope of the illustrative embodiments. However, in one illustrative embodiment, the NLP operation comprises processing an input question by a QA system so as to utilize synonyms for terms in the input question to facilitate the generation of queries applied against a corpus of documents that are potential sources of candidate answers to the input question.

Thus, with the mechanisms of the illustrative embodiments context aware identification of synonyms is made possible so as to identify synonyms relevant to the particular conceptual unit rather than using general or imprecise synonym lists, or requiring user action recording to identify synonyms based on previous interactions by users. As a result, better NLP operation results are generated by focusing such NLP operations on synonyms that are relevant to the particular context of the portion of content, e.g., query or input question.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, functional programming languages such as Prolog and LISP, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
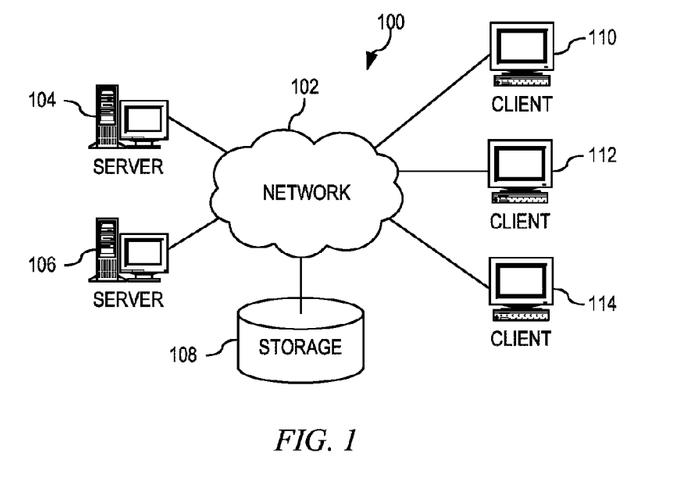
FIG. 1 is an example diagram of a distributed data processing system in which aspects of the illustrative embodiments may be implemented.
Figure 2:
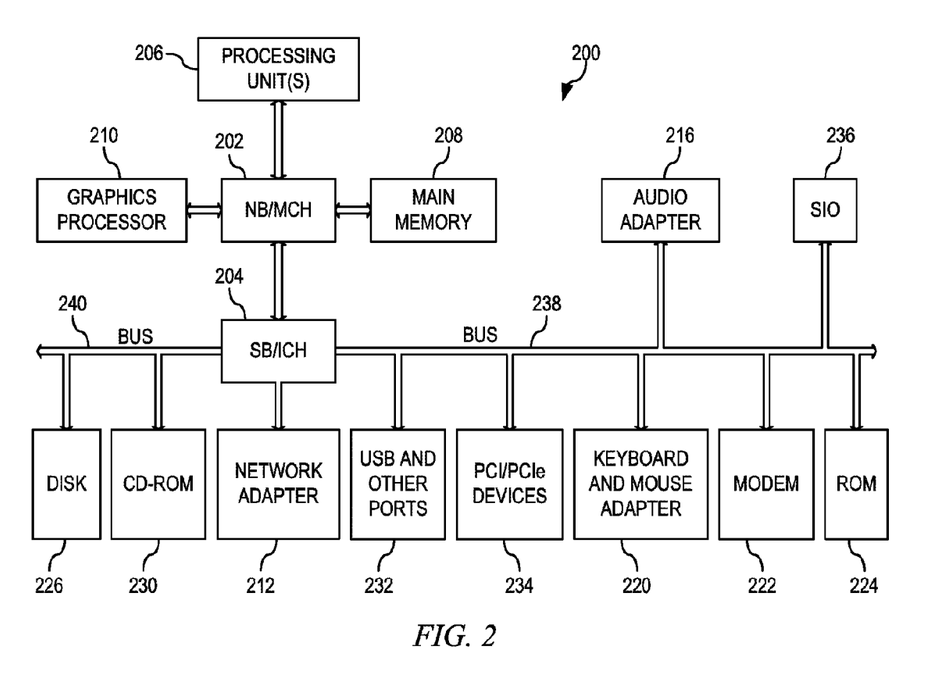
FIG. 2 is an example block diagram of a computing device in which aspects of the illustrative embodiments may be implemented.

The illustrative embodiments provide mechanisms for improving the operation of natural language processing mechanisms by verifying synonyms used by such natural language processing mechanisms based on the conceptual context of the original term for which the synonym is to be used. As such, the mechanisms of the illustrative embodiments may be utilized in many different types of natural language processing systems including, but not limited to, search engines, question and answer (QA) systems, and the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

One or more of the computing devices in FIG. 1, e.g., servers 104 and/or 106, may implement a natural language processing mechanism in accordance with the illustrative embodiments. Such a natural language processing mechanism comprises a conceptual context synonym verification engine having logic for implementing the various operations and algorithms described herein. It should be appreciated that a "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

Figure 3:
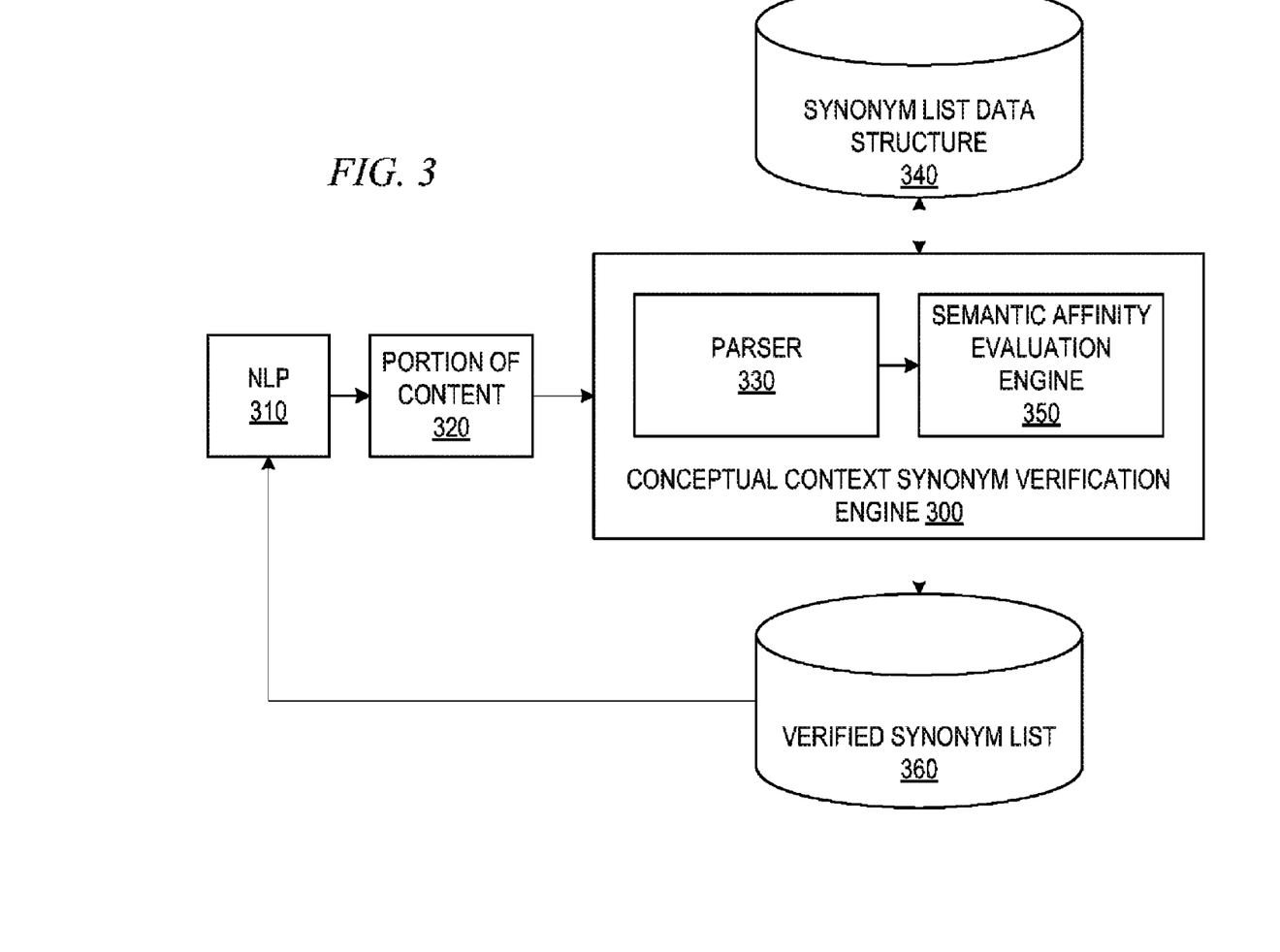
FIG. 3 is an example block diagram of a conceptual context synonym verification engine in accordance with one illustrative embodiment.

FIG. 3 is an example block diagram of a conceptual context synonym verification engine in accordance with one illustrative embodiment. The elements shown in FIG. 3 may be implemented in hardware, software executing on hardware, or any combination of hardware and software. As shown in FIG. 3, a natural language processing mechanism 310, such as a search engine, QA system, or the like, submits a portion of content 320 to the conceptual context synonym verification engine 300. The portion of content 320 may be any portion of textual content that includes a plurality of words/terms in which at least one of the words/terms is an original word/term that has a synonym that needs to be verified as being a valid synonym for the original word/term (hereafter referred to simply as a "term") within the conceptual context of the portion of content 320. Thus, for example, the portion of content 320, in some illustrative embodiments, may be a query submitted to or generated by a search engine, an input question received by a QA system for processing, a portion of a document that is subjected to natural language processing, or the like.

The received portion of content 320 is parsed by a parser 330 of the conceptual context synonym verification engine 300 to identify a conceptual unit within the portion of content 320, terms in the conceptual unit and/or portion of content 320, remove stop words from the conceptual unit and/or portion of content, and otherwise tokenize the portion of content 320 for processing by the semantic affinity evaluation engine 350. With regard to a "conceptual unit" what is meant is a portion of text that is associated with a same concept.

There are multiple ways to define conceptual units. These include, but are not limited to analyzing the structure of the document, and define conceptual units as the smallest individually named/numbered sections. In the present document, for example, one may define semantic units as numbered paragraphs.

Another way to define conceptual units is to analyze the potential for ambiguity between a term and its potential synonym, and base the conceptual unit size on a corresponding threshold. As one increases the size of the conceptual unit from a 2-gram (adjacent terms) to sentence, paragraph, document, collection of documents, and the entire corpus, the distance metric will get smaller and smaller until the point where all words are equally related (the entire corpus as one unit). One can measure potential for ambiguity by determining the distance between terms in question and other random words from the corpus at various different conceptual unit sizes, and then set a corresponding threshold.

A third way to define conceptual units is to treat "conceptual unit" as "semantic resolution" and empirically experiment to determine what conceptual unit size most closely matches the writing styles of the authors of the corpus. Thus, the portion of content may comprise one or more conceptual units depending upon the number of concepts covered by the portion of content. Of course, other ways of defining conceptual units may be used without departing from the spirit and scope of the present invention.

For simplicity, in the case of queries or input questions, the portion of content 320 itself may be the conceptual unit. In other embodiments, the portion of content may comprise a document, paragraph, or larger portion of text that may comprise multiple concepts, each of which may be considered a conceptual unit, e.g., the conceptual units in such a case may be sentences, n-grams, clauses, or the like. For purpose of the following description, it will be assumed that the portion of content 320 comprises a single conceptual unit, such as in the case of a query submitted to a search engine or an input question submitted to a QA system.

The terms identified by the parser 330 may further be used to perform a lookup operation in a synonyms list data structure 340 that stores synonyms for terms in portions of content. In some illustrative embodiments, the synonyms list data structure 340 may store a generic synonyms list that stores synonyms for a plurality of different terms regardless of subject matter domain. In other illustrative embodiments, the synonyms list data structure 340 may store a plurality of synonym lists that are associated with different domains. In such an embodiment, the NLP mechanism 310 may send, with the portion of content 320, an indicator of the domain with which the NLP mechanism 310 determines the portion of content 320 is associated. For example, in a QA system, as part of processing an input question, the QA system may determine a domain associated with the input question and submit an indicator of this domain to the conceptual context synonym verification engine 300 which then uses this indication of domain to select a domain specific synonym list from the synonyms list data structure 340. While the invention may be used with domain specific synonym lists, since the present invention operates to identify valid synonyms based on the context, domain specific synonym lists are not necessary. However, the mechanisms of the illustrative embodiments may improve upon the operation of any natural language processing system that operates on generic and/or domain specific synonym list data structures.

From the synonym list data structure 340, a set of one or more synonyms for each term identified by the parser 330 is identified and provided to the semantic affinity evaluation engine 350. For each original term identified by the parser 330, and for each synonym for that term identified in the set of one or more synonyms, an operation is performed to determine the semantic affinity, or semantic distance, of the original term with the other identified terms in the portion of content 320, and to determine the semantic affinity of the synonym with the other identified terms in the portion of content 320. For each pair of original term and synonym, the semantic affinity measure calculated for the original term is compared to the semantic affinity measure calculated for the synonym and if a predetermined relationship exists between these semantic affinity measures, then it is determined that the synonym is a valid synonym for the original term within the conceptual context of the portion of content 320 and should be used in further processing by the NLP mechanism 310.

The semantic affinity evaluation engine 350 may implement any known or later developed semantic affinity or semantic distance calculation algorithms suitable to the particular implementation. As discussed above, examples of such semantic affinity/distance calculation algorithms include, but are not limited to, a Normalized Compressive Distance (NCD) algorithm, a Normalized Google Distance (NGD) algorithm, or the like. NGD, for example, provides a unit-less distance in semantic space between two words. NGD does this by comparing the number of documents that contain the first word, the number of documents that contain the second word, the number of documents containing both words, and the total number of documents in the collection. It is given by the formula below, where M is the total number of web pages searched by Google; f(x) and f(y) are the number of hits for search terms x and y, respectively; and f(x, y) is the number of web pages on which both x and y occur.

$$NGD(x, y) = \frac{\max\{\log f(x), \log f(y)\} - \log f(x, y)}{\log M - \min\{\log f(x), \log f(y)\}}$$

The semantic affinity/distance calculation algorithms are modified to operate on a conceptual unit rather than entire documents or a combination of terms from multiple documents in a corpus strung together, as is the basis of known NCD and NGD algorithms, to determine affinity. That is, a conceptual unit, which may be a sub-portion of a portion of content, is used as the basis of the semantic affinity/distance calculation so that the semantic affinity/distance is calculated with relation to a single concept context. Thus, it is determined how related an original term/synonym is to the other terms within a narrower conceptual context than looking at an entire document, a corpus of documents, or the like. As a result, the mechanisms of the illustrative embodiments are able to perform conceptual context based synonym verification.

The semantic affinity evaluation engine 350 calculates, for each pair of the original term with another term in the conceptual unit of the portion of content 320, a semantic affinity/distance using a semantic affinity/distance function f( ) e.g., NGD(Wn, ORIG) where NGD is a Normalized Google Distance (NGD) function that operates on W and ORIG where W is a set of remaining words/terms in the conceptual unit and ORIG is the original word/term. A sum of these semantic affinities/distances across all pairs of the original term with other terms in the conceptual unit is generated, e.g., sum from 1 to N of NGD(Wn, ORIG). A relative contribution of each semantic affinity/distance to the total may be provided by multiplying each semantic affinity/distance by 1/N when performing the summation, e.g., 1/N*f(Wn, ORIG) summed over the range from 1 to N.

A similar calculation may be performed for the synonym being evaluated such that a function, in one illustrative embodiment, may be 1/N*NGD(Wn, SYN). A constant α may be applied to each semantic affinity/distance measure to accommodate imprecise matches of synonyms.

The semantic affinity/distance measures generated for the original term and the synonym may be compared to one another to determine if a predefined relationship exists between these semantic affinity/distance measures. If the relationship exists, i.e. a "pass" result is generated, then the synonym is determined to be a valid synonym for the conceptual context of the conceptual unit. If the relationship does not exist, i.e. a "fail" result is generated, then the synonym is determined to not be a valid synonym for the conceptual context of the conceptual unit. In the case of a "fail" result, the synonym may be removed from the synonym list that is passed back to the NLP mechanism for use by the NLP mechanism in performing an NLP operation. If the result is a "pass", then the synonym is maintained in the synonym list. Thus, a verified synonym list 360 is generated and passed back to the NLP mechanism 310. This verified synonym list 360 may comprise all of the synonyms retrieved from the synonym list data structure 340 for the terms in the portion of content 320, or may comprise a pruned or reduced size synonym list in which some of the synonyms have been removed based on "fail" results generated in the manner described above.

In one illustrative embodiment, the predetermined relationship is one in which the semantic affinity/distance of the original term is one or more of equal to, greater than, or less than the semantic affinity/distance of the synonym. In one illustrative embodiment, if the semantic distance of the synonym is less than or equal to the semantic distance of the original term, then the synonym is a valid synonym for use by the NLP mechanism 310. If the semantic distance of the synonym is greater than the semantic distance of the original term, then the synonym is not a valid synonym for use by the NLP mechanism 310. This relationship is represented by the above equation 2. Other relationships may be used in addition to, or in replacement of, these relationships depending upon the particular desired implementation.

The NLP mechanism 310 may perform any type of NLP operation suitable to the particular implementation based on the verified synonym list data structure 360 generated by the mechanisms of the illustrative embodiments. For example, in a QA system environment, the verified synonym list data structure 360 may be used to generate queries that are applied against a corpus of information in order to find candidate answers to the input question or to generate modified forms of the input question which may be processed by the QA system to generate candidate answers for an original input question. In addition, or alternatively, the verified synonyms may be used to evaluate the sources of content in the corpus for applicability to queries submitted by the QA system for generation of candidate answers. In a NLP based search engine, the verified synonyms may be used to generate additional queries, evaluate sources of content for the queries, or the like.

Figure 4:
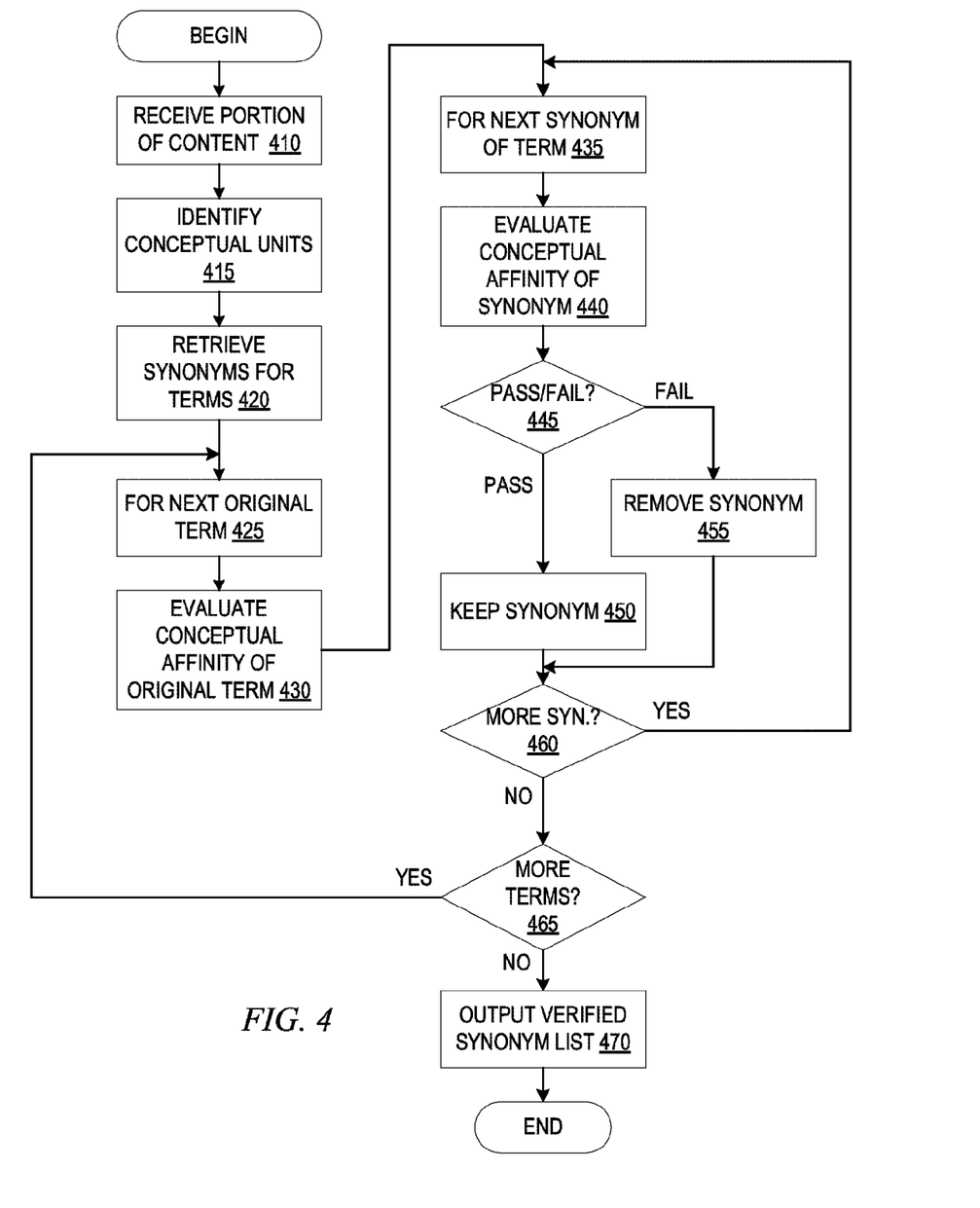
FIG. 4 is a flowchart outlining an example operation of a conceptual context synonym verification engine in accordance with one illustrative embodiment.

FIG. 4 is a flowchart outlining an example operation of a conceptual context synonym verification engine in accordance with one illustrative embodiment. As shown in FIG. 4, the operation starts with receiving, from an NLP mechanism, a portion of content for which synonyms are to be verified (step 410). The portion of content is parsed to identify conceptual units and terms within the portion of content (step 415). One or more synonym lists for the terms in the portion of content are retrieved based on results of the parsing (step 420). For a next original term in the terms of the portion of content (step 425), the original term is evaluated with regard to other terms in the same conceptual unit in which the term is present to thereby generate a measure of affinity of the original term to the other terms within the conceptual unit (step 430).

For the next synonym associated with the original term (step 435), the synonym is evaluated with regard to other terms in the same conceptual unit as the original term to thereby generate a measure of affinity of the synonym to the other terms within the conceptual unit (step 440). The operation then determines if the measure of affinity of the original term has a predetermined relationship (pass) to the measure of affinity of the synonym or not (fail) (step 445). If so, then the synonym in maintained in the synonym list data structure (step 450). If not, the synonym is discarded from the synonym list data structure (step 455). A determination is then made as to whether there are additional synonyms to process (step 460). If so, the operation returns to step 435. If not, the operation determines if there are more terms to be evaluated (step 465). If there are more terms to be evaluated, the operation returns to step 425. If there are no more terms to be evaluate, then the resulting verified synonym list data structure is returned to the NLP mechanism for use in performing NLP operations (step 470).

Thus, the illustrative embodiments provide mechanisms for verifying synonyms to be valid synonyms for a particular conceptual context of the original term. Thus, a more accurate listing of synonyms to be evaluated by a NLP mechanism is generated based on the relatedness of the synonym to the conceptual context of the original term. As a result, a more accurate operation of the NLP mechanisms is achieved due to a more accurate listing of synonyms being considered.

As mentioned above, the mechanisms of the illustrative embodiments may be implemented with various types of NLP mechanisms including search engines, QA systems, and the like. QA systems operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these questions and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system. One example of a question/answer generation which may be used in conjunction with the principles described herein is described in U.S. Patent Application Publication No. 2011/0125734, which is herein incorporated by reference in its entirety.

Returning to FIG. 1, the distributed data processing system 100 of FIG. 1 may implement a QA system on one or more of the computing devices 104 (comprising one or more processors and one or more memories, and potentially any other computing device elements generally known in the art including buses, storage devices, communication interfaces, and the like) connected to the computer network 102. The QA system and network 102 may enable question/answer (QA) generation functionality for one or more QA system users via their respective computing devices 110-112.

The QA system may be configured to implement a QA system pipeline that receives inputs from various sources. For example, the QA system may receive input from the network 102, a corpus of electronic documents, QA system users, or other data and other possible sources of input. In one embodiment, some or all of the inputs to the QA system may be routed through the network 102. The various computing devices 104 on the network 102 may include access points for content creators and QA system users. Some of the computing devices 104 may include devices for a database storing the corpus of data 108 (which is shown as a separate entity in FIG. 1 for illustrative purposes only). Portions of the corpus of data 108 may also be provided on one or more other network attached storage devices, in one or more databases, or other computing devices not explicitly shown in FIG. 1. The network 102 may include local network connections and remote connections in various embodiments, such that the QA system may operate in environments of any size, including local and global, e.g., the Internet.

In one embodiment, the content creator creates content in a document for use as part of a corpus of data 108 with the QA system. The document may include any file, text, article, or source of data for use in the QA system. QA system users may access the QA system via a network connection or an Internet connection to the network 102, and may input questions to the QA system that may be answered by the content in the corpus of data 108. In one embodiment, the questions may be formed using natural language. The QA system may interpret the question and provide a response to the QA system user, e.g., QA system user 110, containing one or more answers to the question. In some embodiments, the QA system may provide a response to users in a ranked list of candidate answers.

The QA system implements a QA system pipeline which comprises a plurality of stages for processing an input question, the corpus of data 108, and generating answers for the input question based on the processing of the corpus of data 108. The QA system pipeline will be described in greater detail hereafter with regard to FIG. 5.

In some illustrative embodiments, the QA system may be the IBM Watson™ QA system available from International Business Machines Corporation of Armonk, N.Y., which is augmented with the mechanisms of the illustrative embodiments described hereafter. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Figure 5:
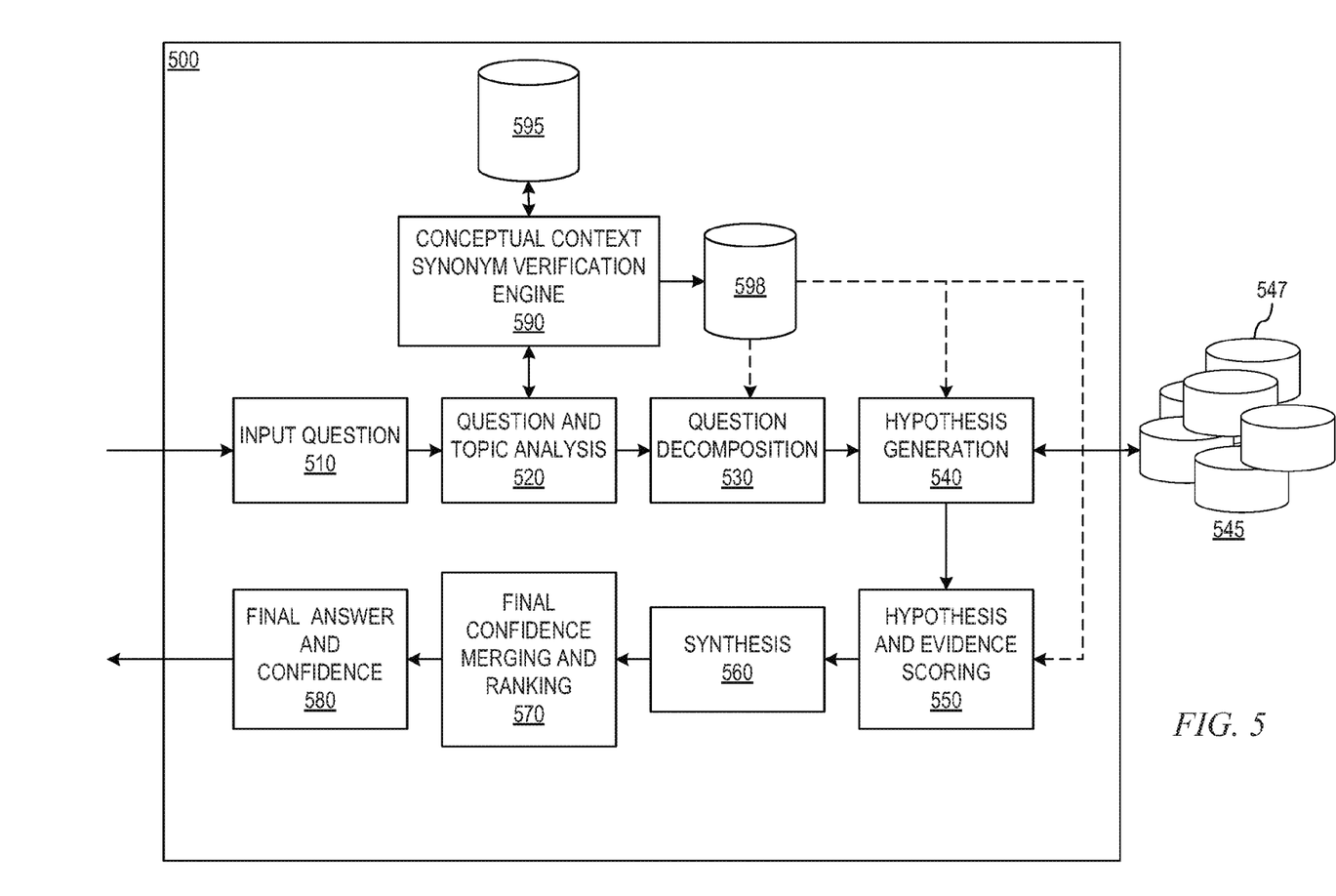
FIG. 5 illustrates a QA system pipeline for processing an input question in accordance with one illustrative embodiment.

FIG. 5 illustrates a QA system pipeline for processing an input question in accordance with one illustrative embodiment. The QA system pipeline of FIG. 5 may be implemented, for example, as QA system pipeline of a QA system in FIG. 1. It should be appreciated that the stages of the QA system pipeline shown in FIG. 5 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 5 may be augmented, for example, in one or more of the stages to implement the improved mechanism of the illustrative embodiments described hereafter, additional stages may be provided to implement the improved mechanism, or separate logic from the pipeline 500 may be provided for interfacing with the pipeline 500 and implementing the improved functionality and operations of the illustrative embodiments As shown in FIG. 5, the QA system pipeline 500 comprises a plurality of stages 510-580 through which the QA system operates to analyze an input question and generate a final response. In an initial question input stage 510, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e. the question and topic analysis stage 520, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 530 to decompose the question into one or more queries that may be applied to the corpora of data/information 545 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 545. That is, these various sources themselves, different collections of sources, and the like, may represent a different corpus 547 within the corpora 545. There may be different corpora 547 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 547 within the corpora 545.

The queries may be applied to one or more databases storing information about the electronic texts, documents, articles, websites, and the like, that make up the corpus of data/information, e.g., the corpus of data 108 in FIG. 1. The queries being applied to the corpus of data/information at the hypothesis generation stage 540 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA system pipeline 500, in stage 550, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 560, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 570 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, may be generated and output to the submitter of the original input question.

In accordance with the illustrative embodiments, to aid in processing the input question 510 by the QA system pipeline 500, the QA system pipeline 500 implements a conceptual context synonym verification engine 590, which may operate in accordance with one or more of the illustrative embodiments described previously above, such as with regard to conceptual context synonym verification engine 300 in FIG. 3, for example. In this implementation of the mechanisms of the illustrative embodiments, the input question 510 is considered to be the conceptual unit upon which the conceptual context synonym verification engine 590 operates. The corpus upon which the QA system operates is also analyzed and separated into conceptual units, such as part of a corpus ingestion operation, preprocessing operation, or the like, such that distance and/or affinity calculations may be performed. Other operations of the parser may be integrated into the question and topic analysis stage logic 520 when performing feature extraction.

The conceptual context synonym verification engine 590 may receive the extracted features of the input question 510 as generated by the question and topic analysis stage logic 520 which includes the terms of the input question 510 and potentially a domain of the input question 510. The domain of the input question 510 may be specified by the submitter of the input question 510, may be automatically determined from analysis of the extracted features of the input question 510, e.g., matching terms in the input question 510 to terms associated with various domains, or the like.

The conceptual context synonym verification engine 590 may then retrieve a corresponding synonym list for the terms in the extracted features from the synonym list data structure 595. Such retrieval of a corresponding synonym list may be based on the identified domain of the input question 510 or may involve retrieving a more general synonym list that is not domain specific. The conceptual context synonym verification engine 590 then performs the synonym verification operations previously described above in accordance with one or more of the illustrative embodiments so as to generate a verified synonym list data structure 598 that is passed as input to one or more of the question decomposition stage logic 530, the hypothesis generation stage logic 540, and/or the hypothesis and evidence scoring stage logic 550. These various stages may utilize the verified synonyms list data structure 598 to perform their associated operations that involve natural language processing of the input question 510 and/or the content in the corpus 547 or corpora 545. Examples of such natural language processing operations performed by a QA system pipeline are described in "Finding Needles in the Haystack: Search and Candidate Generation," Chu-Carroll et al, IBM Journal of Research and Development, Volume 56, Issue 3.4, May-June 2012 and "Question Analysis: How Watson Reads a Clue," Lally et al., IBM Journal of Research and Development, Volume 56, Issue 3.4, May-June 2012.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, wherein the memory comprises instructions which are executed by the processor to specifically configure the processor to implement a conceptual context synonym verification engine that performs context based synonym filtering for natural language processing, the method comprising:
   parsing, by the conceptual context synonym verification engine of the data processing system, content provided by a natural language processing system, into one or more conceptual units, wherein each conceptual unit comprises a portion of text of the content that is associated with a single concept;
   for each conceptual unit in the one or more conceptual units, identifying, by the conceptual context synonym verification engine of the data processing system, a term in the conceptual unit that has a synonym to be utilized during natural language processing of the content;
   determining, by the conceptual context synonym verification engine of the data processing system, a first measure of relatedness of the term to at least one other term in the conceptual unit;
   determining, by the conceptual context synonym verification engine of the data processing system, a second measure of relatedness of the synonym of the term to the at least one other term in the conceptual unit;
   determining, by the conceptual context synonym verification engine of the data processing system, whether or not to utilize the synonym when performing natural language processing on the conceptual unit, based on the first measure of relatedness and second measure of relatedness;
   configuring, by the conceptual context synonym verification engine, the natural language processing system to utilize or not utilize the synonym, when performing natural language processing on the content, based on results of determining whether or not to utilize the synonym when performing natural language processing on the conceptual unit; and
   performing, by the natural language processing system, natural language processing on the content based on results of determining whether or not to utilize the synonym, wherein the content is electronic content that is input to the data processing system.

2. The method of claim 1, wherein the content is a question input to a question and answer mechanism of the data processing system that implements the natural language processing on the question.

3. The method of claim 1, wherein determining whether or not to utilize the synonym when performing natural language processing on the conceptual unit comprises:
   comparing the first measure of relatedness to the second measure of relatedness; and
   determining to utilize the synonym when performing natural language processing on the conceptual unit in response to the first measure having a specified relationship to the second measure.

4. The method of claim 3, wherein the specified relationship is that the first measure is greater than or equal to the second measure.

5. The method of claim 1, wherein the first measure of relatedness of the term to at least one other term in the conceptual unit is a first semantic distance between the term and the at least one other term in the conceptual unit, and wherein the second measure of relatedness of the synonym of the term to the at least one other term in the conceptual unit is a second semantic distance between the synonym and the at least one other term in the conceptual unit.

6. The method of claim 5, wherein the first semantic distance and the second semantic distance are generated using at least one of a Normalized Compressive Distance algorithm, a Normalized Google Distance algorithm, or other semantic similarity algorithm.

7. The method of claim 1, wherein the first measure of relatedness is calculated as the sum, from 1 to N, where N is a number of remaining words in the conceptual unit, of the quantity $1/N*(f(W_n, ORIG))$, where $f( )$ is a semantic distance function, W is the set of remaining words in the conceptual unit, and ORIG is the term, and wherein the second measure of relatedness is calculated as the sum, from 1 to N, of the quantity $alpha*1/N*(f(W_n, SYN))$, where alpha is a constant, and SYN is the synonym.

8. The method of claim 7, wherein determining whether or not to utilize the synonym when performing natural language processing on the conceptual unit comprises:
   comparing the first measure of relatedness to the second measure of relatedness using the following relationship:

$$\sum_{n=1}^{N} \frac{1}{N} f(W_{n}, ORIG) \leq \sum_{n=1}^{N} \alpha \frac{1}{N} f(W_{n}, SYN) \begin{Bmatrix} pass \\ fail \end{Bmatrix};$$

and
   determining to utilize the synonym when performing natural language processing on the conceptual unit in response to the relationship being satisfied.

9. A computer program product comprising a non-transitory computer readable medium having a computer readable program stored therein, wherein the computer readable program, when executed on a computing device, causes the computing device to be specifically configured to implement a conceptual context synonym verification engine and to:
   parse, by the conceptual context synonym verification engine, content provided by a natural language processing system, into one or more conceptual units, wherein each conceptual unit comprises a portion of text of the content that is associated with a single concept;

for each conceptual unit in the one or more conceptual units, identify, by the conceptual context synonym verification engine, a term in the conceptual unit that has a synonym to be utilized during natural language processing of the content;

determine, by the conceptual context synonym verification engine, a first measure of relatedness of the term to at least one other term in the conceptual unit;

determine, by the conceptual context synonym verification engine, a second measure of relatedness of the synonym of the term to the at least one other term in the conceptual unit;

determine, by the conceptual context synonym verification engine, whether or not to utilize the synonym when performing natural language processing on the conceptual unit, based on the first measure of relatedness and second measure of relatedness;

configure, by the conceptual context synonym verification engine, the natural language processing system to utilize or not utilize the synonym, when performing natural language processing on the content, based on results of determining whether or not to utilize the synonym when performing natural language processing on the conceptual unit; and perform, by the natural language processing system, natural language processing on the content based on results of determining whether or not to utilize the synonym, wherein the content is electronic content that is input to the computing device.

10. The computer program product of claim 9, wherein the content is a question input to a question and answer mechanism of the data processing system that implements the natural language processing on the question.

11. The computer program product of claim 9, wherein the computer readable program further causes the computing device to determine whether or not to utilize the synonym when performing natural language processing on the conceptual unit at least by:

comparing the first measure of relatedness to the second measure of relatedness; and determining to utilize the synonym when performing natural language processing on the conceptual unit in response to the first measure having a specified relationship to the second measure.

12. The computer program product of claim 11, wherein the specified relationship is that the first measure is greater than or equal to the second measure.

13. The computer program product of claim 9, wherein the first measure of relatedness of the term to at least one other term in the conceptual unit is a first semantic distance between the term and the at least one other term in the conceptual unit, and wherein the second measure of relatedness of the synonym of the term to the at least one other term in the conceptual unit is a second semantic distance between the synonym and the at least one other term in the conceptual unit.

14. The computer program product of claim 13, wherein the first semantic distance and the second semantic distance are generated using at least one of a Normalized Compressive Distance algorithm, a Normalized Google Distance algorithm, or other semantic similarity algorithm.

15. The computer program product of claim 9, wherein the first measure of relatedness is calculated as the sum, from 1 to N, where N is a number of remaining words in the conceptual unit, of the quantity 1/N*(f(Wn, ORIG)), where f( ) is a semantic distance function, W is the set of remaining words in the conceptual unit, and ORIG is the term, and wherein the second measure of relatedness is calculated as the sum, from 1 to N, of the quantity alpha*1/N*(f(Wn, SYN)), where alpha is a constant, and SYN is the synonym.

16. The computer program product of claim 15, wherein the computer readable program further causes the computing device to determine whether or not to utilize the synonym when performing natural language processing on the conceptual unit at least by:

comparing the first measure of relatedness to the second measure of relatedness using the following relationship:

$$\sum_{n=1}^{N} \frac{1}{N} f(W_{n'} ORIG) \le \sum_{n=1}^{N} \alpha \frac{1}{N} f(W_{n'} SYN) \begin{Bmatrix} \text{pass} \\ \text{fail} \end{Bmatrix};$$

and determining to utilize the synonym when performing natural language processing on the conceptual unit in response to the relationship being satisfied.

17. An apparatus comprising:

a processor; and a memory coupled to the processor, wherein the memory comprises instructions which, when executed by the processor, cause the processor to be specifically configured to implement a conceptual context synonym verification engine and to:

parse, by the conceptual context synonym verification engine, content provided by a natural language processing system, into one or more conceptual units, wherein each conceptual unit comprises a portion of text of the content that is associated with a single concept;

for each conceptual unit in the one or more conceptual units, identify, by the conceptual context synonym verification engine, a term in the conceptual unit that has a synonym to be utilized during natural language processing of the content;

determine, by the conceptual context synonym verification engine, a first measure of relatedness of the term to at least one other term in the conceptual unit;

determine, by the conceptual context synonym verification engine, a second measure of relatedness of the synonym of the term to the at least one other term in the conceptual unit;

determine, by the conceptual context synonym verification engine, whether or not to utilize the synonym when performing natural language processing on the conceptual unit, based on the first measure of relatedness and second measure of relatedness;

configure, by the conceptual context synonym verification engine, the natural language processing system to utilize or not utilize the synonym, when performing natural language processing on the content, based on results of determining whether or not to utilize the synonym when performing natural language processing on the conceptual unit; and perform, by the natural language processing system, natural language processing on the content based on results of determining whether or not to utilize the synonym, wherein the content is electronic content that is input to the computing device.

18. The apparatus of claim 17, wherein the instructions further cause the processor to determine whether or not to utilize the synonym when performing natural language processing on the conceptual unit at least by:

comparing the first measure of relatedness to the second measure of relatedness; and     determining to utilize the synonym when performing natural language processing on the conceptual unit in response to the first measure being greater than or equal to the second measure.

19. The apparatus of claim 18, wherein the specified relationship is that the first measure is greater than or equal to the second measure.

20. The apparatus of claim 17, wherein the content is a question input to a question and answer mechanism of the data processing system that implements the natural language processing on the question.

\* \* \* \* \*